United States Patent [19]
Gaffard et al.

[11] Patent Number: 5,085,509
[45] Date of Patent: Feb. 4, 1992

[54] APPARATUS AND METHOD FOR ALIGNING AN OPTICAL BEAM

[75] Inventors: Jean-Paul Gaffard, Fontainbleau; Robert Ravelet, Longjumeau; Geneviève Chabassier, Paris; Jacques Griffaton, Chalon sur Saone, all of France

[73] Assignee: Framatome, Courbevoie, France

[21] Appl. No.: 316,749

[22] Filed: Feb. 28, 1989

[30] Foreign Application Priority Data

Feb. 29, 1988 [FR] France .................. 88 02473

[51] Int. Cl.⁵ ............... G01B 11/26; B23K 26/02
[52] U.S. Cl. .................... 356/153; 356/138; 219/121.79
[58] Field of Search .......... 356/128, 153, 150, 146, 356/400; 219/121.6, 121.61, 121.62, 121.63, 121.76, 121.78, 121.79, 121.13

[56] References Cited

U.S. PATENT DOCUMENTS

| | | | |
|---|---|---|---|
| 3,844,660 | 10/1974 | Hunter | 356/153 |
| 3,892,488 | 7/1975 | Edmonds | 356/153 |
| 4,466,739 | 8/1984 | Kasner et al. | 356/153 |
| 4,659,916 | 4/1987 | Müller et al. | 219/121.79 |
| 4,668,088 | 5/1987 | Quinque et al. | 356/138 |
| 4,772,122 | 9/1988 | Rasner | 356/153 |

FOREIGN PATENT DOCUMENTS

| | | |
|---|---|---|
| 0154866 | 9/1985 | European Pat. Off. . |
| 0238171 | 9/1987 | European Pat. Off. . |
| 0217077 | 1/1988 | European Pat. Off. . |
| 6047482 | of 0000 | Japan . |
| 57137092 | of 0000 | Japan . |

Primary Examiner—Richard A. Rosenberger
Assistant Examiner—Hoa Pham
Attorney, Agent, or Firm—Pollock, Vande Sande & Priddy

[57] ABSTRACT

The alignment apparatus is intended for repairing welds using infrared radiation and a weldhead (30) inside a heat exchanger tube (14) in the water box (20) of a steam generator associated with a nuclear reactor. A power beam (PE, PL, PS) is transported to the axis (24) of a tube (14) to be treated via two motor-driven light deflectors referred to as an "emitter" (11) fixed adjacent to an access hole into the water box, and as a "receiver" (12) carried by a "carrier" (22) at the entrance to the tube to be treated. The power beam is surrounded coaxially by a visible beam (AE, AL, AS) which is used for establishing and maintaining an optical connection between the emitter and the receiver by means of retroreflectors (15) and an autocollimation mirror (17) carried by the receiver (12) and by detectors (16, 18) carried by the emitter (11).

8 Claims, 3 Drawing Sheets

APPARATUS AND METHOD FOR ALIGNING AN OPTICAL BEAM

FIELD OF THE INVENTION

The present invention relates to a method and apparatus for aligning an optical beam, e.g., an infrared power laser beam used for welding. Such alignment consists in taking an input beam which is provided by a light source at a given position and in a given direction, and in obtaining an output beam whose position and direction are adjustable in order to permit effective utilization possible.

BACKGROUND OF THE INVENTION

The present invention is more particularly applicable to the case where a utilization member which is to receive the output beam is independently moveable relative to the light source. The power source may be a fixed carbon dioxide laser, for example, of relatively large weight and bulk, and suitable for providing an infrared beam with enough power for welding a collar in a tube of a steam generator in a nuclear reactor. Because of its bulk, the source can only be installed outside the water box of the generator, i.e., at a distance from the location at which the power is required. The beam must thus be transported from the laser to a welding head which constitutes said utilization member and which is installed in the tube to be repaired, and alignment is therefore necessary. Between the source and the position of utilization, there are two obstacles to be overcome:

1/penetration into the water box; and
2/penetration into the tube in the bundle of tubes.

In a prior art arrangement, the path to be followed is split into three lengths so as to obtain two intermediate points which are in sight of each other and which are situated inside the water box. Devices referred to below respectively as the "emitter" and as the "receiver" are placed at these two points. The source-to-emitter and the receiver-to-weldhead paths are traversed by conventional arrangements, with the receiver-to-weldhead path running along the axis of the tube to be repaired and being capable of being defined relative to the receiver by pressing the receiver against a surface which is fixed to the tube.

There remains the problem of controlling the emitter and the receiver in such a manner as to obtain a properly aligned outlet beam.

A system for providing such alignment is disclosed, for example, in EP-A-238171. This prior system includes a certain number of arrangements which, with respect to their functions mentioned below, are common to said system and to certain systems in accordance with the present invention, which common dispositions may be initially identified in general:

an emitter for receiving main power radiation and for transmitting it in the form of a main link beam controllable in direction to enable it to be directed towards a moveable receiver;

said receiver being adapted, when usefully receiving said main link beam, for transmitting it in the form of a main outlet beam and for causing a controllable angular deflection to appear between said two beams;

a moveable carrier carrying said receiver and controllable in position in order to control the position of said main outlet beam;

positioning means controlling the position of said carrier in order to bring said receiver onto a utilization axis on which the power of said main outlet beam is to be used; and optical aiming means comprising:

an auxiliary source for generating auxiliary radiation transmitted by said emitter in the form of an auxiliary link beam having the same direction as said main link beam;

emitter control means sensitive to the irradiation of said receiver by a portion of said auxiliary radiation in order to control said emitter in such a manner that said auxiliary beam and said main link beam are directed towards said receiver;

a receiver mirror associated with said receiver for reflecting the remaining portion of said auxiliary radiation towards said emitter in the form of a return beam whose direction depends on said angular deflection of the receiver; and receiver control means associated with said emitter and sensitive to the direction error of said return beam relative to said link beams in order to control said receiver in such a manner as to cause it to receive said main link beam usefully and to form said main outlet beam along said utilization axis.

This prior system described in EP-A-238171 suffers from the following drawbacks:

fragile equipment such as detectors, sensors, and video cameras are used in the hostile environment which surrounds the receiver;

implementation is discontinuous;

alignment must be performed each time the tube being treated is changed;

mechanical complexity; and high cost.

SUMMARY OF THE INVENTION

The object of the present invention is to provide a simple and accurate system which can be used continuously during successive welding operations or other treatments that require a power beam. Another object is to provide such a system using a minimum amount of fragile equipment associated with the receiver which moves, in the example described, inside the water box.

Systems according to the present invention comprise:

an emitter for receiving at least one inlet beam and for transmitting it in the form of a link beam;

a moveable receiver at a distance from said emitter; and control means for ensuring that said receiver receives said link beam and transforms it into an outlet beam in alignment with a utilization axis.

More particularly, a system according to a first aspect of the present invention comprises:

said emitter for receiving a main inlet beam constituted by a main working beam and for transmitting it in the form of a main link beam which is controllable in direction;

said receiver for receiving said main link beam and for applying a controllable angular deflection thereto suitable for transforming it into a main outlet beam aligned on a utilization axis related to a structure external to said alignment system; and optical aiming means comprising:

an auxiliary source for generating auxiliary radiation in the form of an auxiliary inlet beam aligned on the path of said main inlet beam in such a manner that said auxiliary inlet beam is transformed by said emitter into an auxiliary link beam aligned on the path of said main link beam, and that said auxiliary link beam is transformed by said receiver into an auxiliary outlet beam aligned on the path of said main outlet beam;

emitter control means responsive to a fraction of the radiation of said auxiliary link beam received by said receiver in order to control said emitter in such a manner as to cause said auxiliary link beam and said main link beam to be directed towards said receiver; and receiver control means responsive to a fraction of the radiation of said auxiliary link beam received by said receiver in order to control said angular deflection in such a manner as to cause said main outlet beam and said auxiliary outlet beam to be aligned on said utilization axis;

wherein said auxiliary inlet beam is a tubular beam formed coaxially around said main inlet beam, said emitter and receiver control means being located off the path of said main radiation.

This simple disposition makes it possible to prevent said transmitter and receiver control means from impeding the propagation of the main beam, or to prevent them from being damaged by said radiation, without it being necessary to mount them removably for this purpose. This gives rise to a considerable simplification in the system which, in spite of the fact that the overall transit cross-section of the radiation is slightly increased, provides increased ease of access through narrow passages. Naturally, it is desirable, for this purpose, for the cross-sectional light area of the auxiliary link beam to be substantially less than that of the main working beam. In addition, since none of these elements is a moving element, the alignment and the performance of treatment operations in successive locations, e.g., in different tubes to be treated, can be continuously monitored.

In addition, since none of these elements is moved, the alignment and the performance of treatment operations in successive locations, e.g., in different tubes to be treated, can be monitored continuously.

In a preferred embodiment said emitter and receiver control means comprise:

reflector means for reflecting the light of said auxiliary beam towards said emitter; and an annular beam splitter surrounding said main inlet beam and directing the light returned by said reflector means towards detection and analysis means.

A system according to a second embodiment of the present invention comprises:

said emitter for receiving at least one inlet beam and for transmitting it in the form of a link beam the direction of which is controllable;

said receiver; and emitter control means responsive to said receiver being irradiated by said link beam in order to control said emitter in such a manner as to direct said beam towards said receiver;

wherein said emitter control means comprise a retroreflector assembly connected to said receiver and constituted by a plurality of retroreflectors each returning a corresponding portion of said link beam back along the direction of said link beam in order to constitute a retroreflected beam; and a retroreflected beam detector connected to said emitter and forming an image of said retroreflector assembly on an image analyzer system for detecting the position of said receiver relative to said link beam. This image analyzer system thus constitutes a position detector.

Preferably, said image analyzer system serves to compare the light flux received by each of the various image elements respectively formed by various ones of said retroreflectors and which form portions of said image of said retroreflector assembly.

Also preferably, there are at least three of said retroreflectors and they are angularly distributed around the periphery of said link beam.

These dispositions make it possible to direct the link beam accurately towards the receiver, using light detection means coupled to the emitter. An image analyzer system can readily detect any offset of the link beam relative to the receiver because any such offset, even when small, gives rise to easily detected differences between brightnesses of the various elements of the image of the retroreflector assembly.

They make relative measurement possible, e.g., the difference or the ratio between two light fluxes, and the measurement is also directional, with the direction of the detected offset being determined by the angular positions of the retroreflectors which create the image elements whose light flux is modified.

Also preferably, said retroreflectors leave angular gaps between one another to pass light which is usable by other portions of said control means.

A system according to a third embodiment of the present invention comprises:

said emitter;

said receiver receiving said link beam and applying a controllable angular deflection thereto in order to transform it into said outlet beam; and receiver control means for controlling said controllable deflection in such a manner as to align said link beam with a utilization axis related to a structure external to said alignment system, said receiver control means themselves comprising:

a receiver mirror connected to said receiver in order to reflect a portion of the light of said link beam towards said emitter in the form of a return beam whose direction is affected by said controllable deflection; and an error-measuring detector connected to said emitter and responsive to deflections of said reflected beam;

wherein said receiver mirror is placed on the path of said outlet beam so that said return beam is formed from said outlet beam and passes through said receiver on its return path, said mirror having an axis perpendicular to its surface and being mounted to aim relative to said external structure in such a manner as to bring its axis into alignment with said utilization axis.

Preferably, said receiver mirror is held at a distance from said receiver by an outlet part connected thereto, said outlet part being provided with aiming means bearing against said external structure in order to aim said receiver mirror relative to said utilization axis. This mirror is an annular mirror.

These simple dispositions make it possible for said receiver control means to take account of any possible deformation or maladjustment which may affect the receiver, without requiring any elements in addition to those of the above-mentioned prior art system. Those of ordinary skill in the optical art are aware that such deformations or maladjustments may be due to numerous causes, in particular to temperature gradients or variations, or to wear of mechanical parts, and that they can give rise to objectional alignment faults.

Finally, the system of the invention preferably includes a common computer receiving signals from said position detector and said error-measuring detector. The size and the vulnerability of the system are reduced by bringing together the electronic elements constituted by said computer and the two detectors.

The present invention also provides a method of radiation treatment, in particular for welding inside parts which are difficult to access, in particular tubes in a nuclear power station, said method comprising the following operations:

inserting a treatment head inside a part to be treated;
generating treatment radiation at a distance from said part to be treated; and
aligning a beam of said radiation along a utilization axis related to said part to be treated in order to feed radiation to said treatment head;
wherein said beam is aligned by means of an alignment system selected from one of those described hereinabove.

BRIEF DESCRIPTION OF THE DRAWINGS

To facilitate comprehension the invention will now be described in greater detail by way of example with reference to the accompanying drawings, in which

FIG. 4 is a perspective view of a retroreflector assembly contained in the same system.

DESCRIPTION OF PREFERRED EMBODIMENTS

Figure 1:
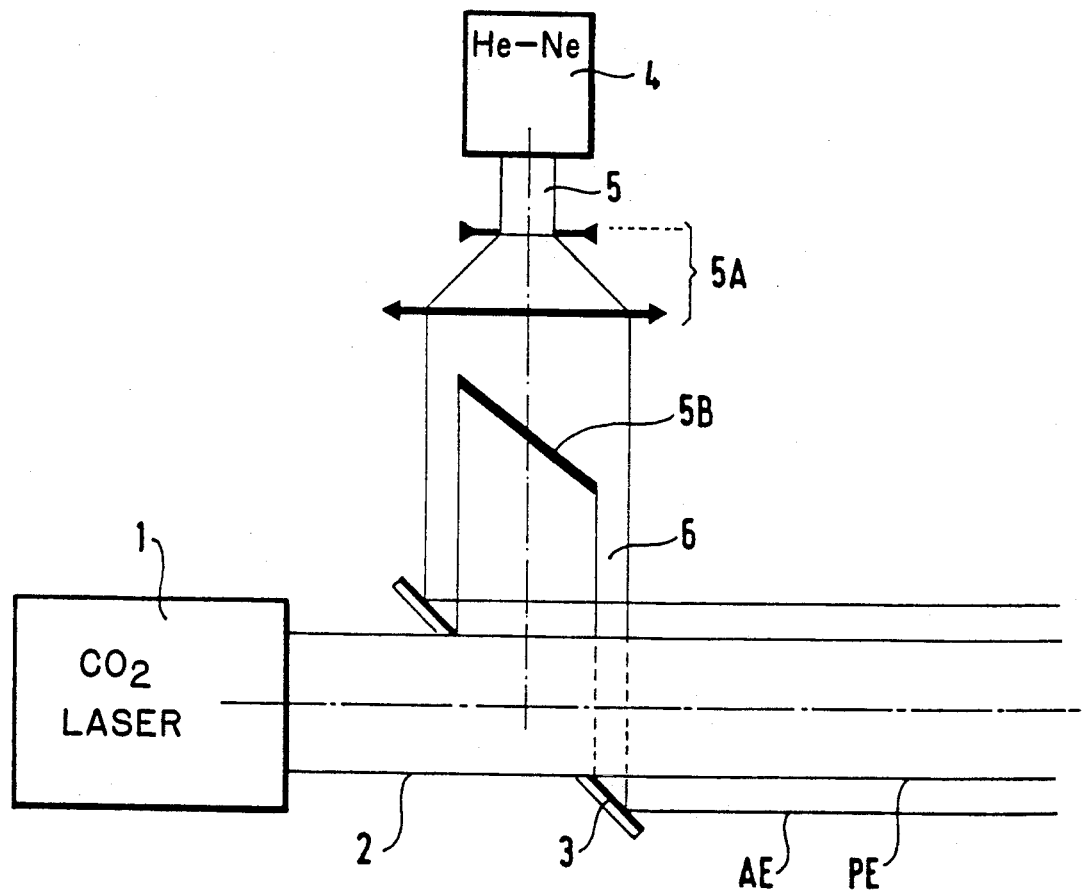
FIG. 1 shows a portion of the system for generating and mutually aligning both inlet beams.

As shown in FIG. 1, a carbon dioxide laser 1 emits a power beam 2 (said main radiation). On the axis of this beam there is an annular mirror 3 whose plane is at an angle of 45° therewith and whose center coincides with the axis of the beam.

He—He laser 4 emits a visible auxiliary radiation beam 5. This beam is magnified at 5A and is then applied to a beam splitter 5B which is opaque in its central portion. This gives rise to a tubular visible beam 6 whose inside diameter is substantially equal to the outside diameter of the power beam. This beam is applied to the annular mirror 3 and thus becomes said auxiliary inlet beam AE which is coaxial with said main inlet beam PE constituted by the beam 2. Fine mechanical adjustment of the position of the mirror 3 makes it possible to align both beams exactly by means of an auxiliary target when the lasers are installed close to the worksite.

Figure 2:
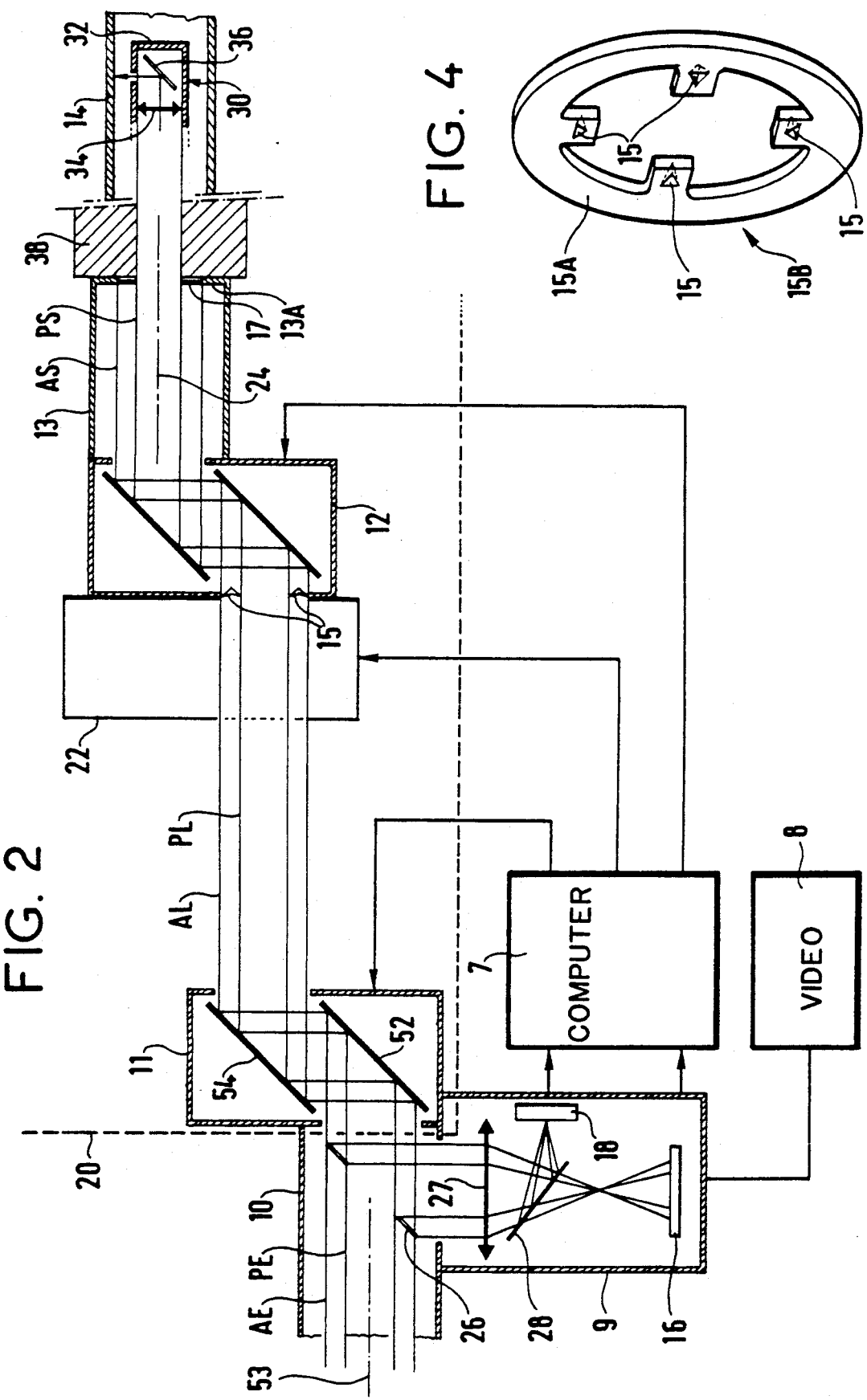
FIG. 2 is a view of other portions of the same system while the method of the invention is being performed.

FIG. 2 shows the means used for transporting the main beam to said treatment head 30. The treatment head is a weldhead. It comprises an envelope 32, a focusing lens 34, and a 45° mirror 36. It is inserted in the tube 14 to be treated inside which a collar is to be welded and whose axis 24 constitutes said utilization axis. The tube is situated inside the water box 20 of the steam generator (not shown) which, in conventional manner, includes numerous other tubes within which it may likewise be necessary to perform welding operations.

The beam transport means are constituted by two beam-deflecting optical assemblies. These two assemblies constitute said emitter 11 and said receiver 12, and the elements of the optical assemblies are motor driven such that each is capable of providing deflection which is controllable along two angular co-ordinates, and which is shown as being zero in FIG. 2. In addition, the receiver 12 is mounted on a carrier 22 which is also motorized so as to enable its position to be controllable along one, two, or three position co-ordinates, i.e., the position of the receiver 12 is also controllable. It is controlled in such a manner as to center an outlet window of the receiver on the utilization axis.

The direction of the beam entering the emitter 11 is given (it is the direction of the axis of the laser 1 relative to which the emitter 11 is adjusted when the system is assembled), as is the direction of the beams leaving the receiver 12 (i.e., the axis of the tube 14 to be treated). The receiver is guided relative to the tube 14 by means of a link tube 13 which constitutes an outlet part of the receiver and which is supplied with annular aiming means 13A. These aiming means bear against a collar tooling 38 which, in turn, bears against a perforated plate (not shown). This perforated plate and the tube 14 are parts of a structure which is external to the claimed alignment system and which is constituted by the said steam generator. By suitably controlling the angular deflections in the emitter and the receiver, it is thus possible to direct the beam leaving the emitter towards the receiver and to ensure that the receiver is set up to receive inlet beams from the emitter, thereby providing an optical link between the emitter and the receiver. This link is constituted by said main and auxiliary link beams PL and AL which are the result of the emitter 11 deflecting the inlet beams PE and AE.

The components of the alignment system are grouped together in two assemblies:

A fixed assembly is situated close to an access manhole into the water box 20. Outside the box, it comprises:

the power laser 1;
the auxiliary laser 4;
the device 5A, 5B, and 3 used for mutually aligning the beams of these two lasers;
a computer 7;
a video monitor box 8; and
a tube 10 which penetrates into the water box 20.

Inside the water box 20, the fixed assembly comprises the emitter-constituting optical assembly 11 at the end of the tube 10.

The alignment system also includes an assembly mounted on the carrier 22 which is installed inside the water box 20. This assembly is moveable while remaining fastened beneath the perforated plate. It comprises:

a receiver-constituting motorized optical assembly 12;
said link tube 13; and
collar tooling 38 including said weldhead 30.

The auxiliary link beam AL is partially retroreflected towards the emitter 11 by four retroreflectors 15 fixed on a support 15A (see FIG. 4), which is itself fixed on the receiver and faces the emitter. These retroreflectors have the well-known shape of corners of cubes and have the special property of returning light back along its direction of arrival regardless of their orientation relative thereto. They constitute a retroreflector assembly 15B.

The beam retroreflected by the assembly 15B is applied via the emitter 11 to an annular beam splitter 26 which reflects it through a lens 27 onto another beam splitter 28 constituted by a semi-reflecting mirror. The light which goes through the beam splitter 28 forms light spots inside a camera 16, said spots constituting an image of the retroreflector assembly 15. This image comprises four spots respectively receiving light flux from the four elementary beams returned by the four retroreflectors, with each spot constituting an image element corresponding to one of the retroreflectors.

The camera 16 is used, in particular, for comparing the light flux in each of these four image elements. In conjunction with said lens, said camera constitutes said position detector. It provides complex image analysis functions and it constitutes a position analyzer system. On the basis of the results of this analysis, the direction of the emitter is accurately adjusted by acting on the emitter motors to ensure beam incidence on the receiver. In addition, by servo-controlling the motors of the emitter to the analysis of the received return image in the camera 16, it is possible to cause the receiver to be continuously tracked by the incident beam.

The non-reflected portion of the auxiliary radiation passes through the receiver 12 in order to form an auxiliary outlet beam AS around the main outlet beam PS. This auxiliary beam arrives at an auto-collimating annular receiver mirror 17 carried by the tube 13 and situated at the inlet to the tube 14 to be treated. The tube 13 constitutes said outlet part of the reciever. It includes an annular shoulder 13A which bears via a tooling 38 on the perforated plate (not shown) to which the tube 14 is connected. This ensures that the axis of the receiver mirror 17 coincides with the axis of the tube 14 to be treated.

The radiation returned by this receiver mirror constitutes said return beam. It passes through the receiver 12 and the emitter 11, is reflected by the beam splitter 26, and, after passing through the lens 27, is reflected by the beam splitter 28 in order to arrive at a camera 18 which constitutes said error-measuring detector which is situated, like the camera 16, inside a housing 9. The image formed by this radiation on said camera 18 is scanned by the camera in order to provide signals representative of the two co-ordinates of the angular error of the auxiliary outlet beam AS, and thus also of the main outlet beam PS, relative to the utilization axis 24.

By acting on the receiver motors, it is possible to adjust the axis of the outlet beams in such a manner as to cause them to be aligned with the axis 24 of the tube 14, which axis is the same as the axis of the mirror 17.

By servo-controlling the motors of the receiver to the return image as scanned by the camera 18, it is possible to keep the outlet beams in alignment with the axis of the tube 14 to be treated regardless of the movements or variations in the components.

Figure 3:
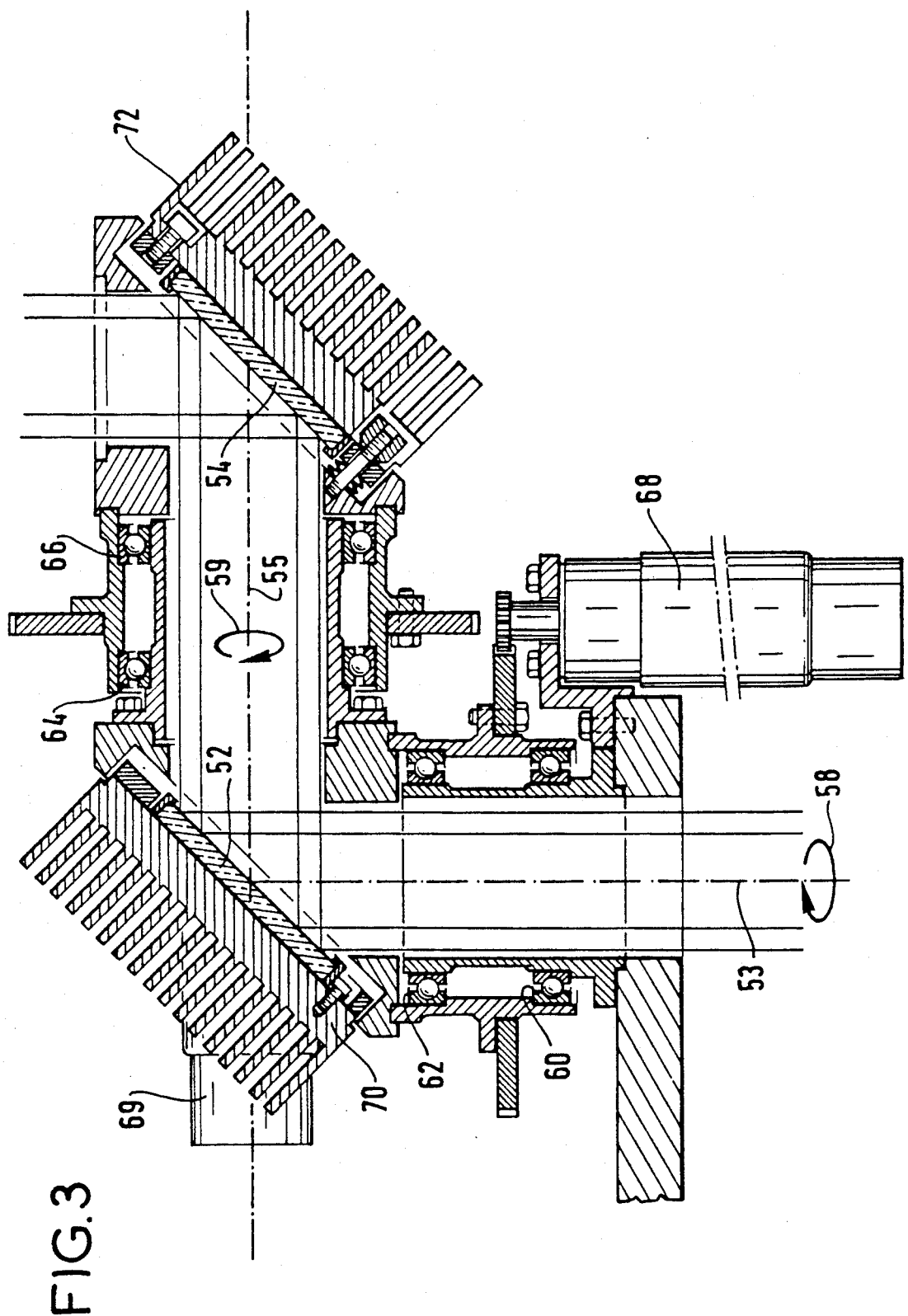
FIG. 3 is a section through a motorized optical assembly suitable for constituting said emitter or said receiver.

As shown in FIG. 3, each motorized optical assembly such as the emitter 11 or the receiver 12 receives a composite beam constituted by the main radiation surrounded by the auxiliary radiation about a common axis which is deflected at each reflection. Such an assembly, for example the emitter 11, comprises the following components:

Two plane mirrors 52 and 54 inclined at 45° to the axis 55 and 55 of the beams which they receive and rotating about said axes, thereby enabling the entire space around said assembly to be scanned, as shown by arrows 58 and 59.

Ball bearings 60, 62, 64, and 66 for guiding and making possible said rotations.

Two motors 68 and 69.

Radiators 70 and 72 for carrying the mirrors 52 and 54 and for cooling them while they are subjected to the main radiation.

A welding operation using the above-described system takes place as follows, after said fixed and moveable assemblies have both been put into positon.

A first operation is performed by calculation since the co-ordinates of the initial position of the moving assembly are known.

This assembly is put into the appropriate position by controlling the motors of the carrier 22 and using said mechanical guidance means (not shown) for appropriately aiming the receiver 12 relative to the tube 14 to be treated. The weldhead 30 is put into place inside the tube by conventional means that have no relevance to the present invention.

Thereafter, the emitter-receiver link is provided by the above-described commands. Initially, only the auxiliary radiation is used. Once alignment has been obtained, the power laser 1 is switched on.

An advantage of this system is that both types of radiation can be used simultaneously or separately. When being used separately, the visible auxiliary radiation is used on its own for initial pre-adjustment and when transferring the receiver and the weldhead from one tube to another. When being used simultaneously, during a welding operation, the visible radiation enables alignment and continuity to be continuously monitored by providing an image of any obstacle which may occur on the path of the beams.

Another advantage is that the beams can be monitored all the way to the receiver-mirror 17 situated downstream from the receiver and which may be located very close to the treatment head, e.g., the weldhead.

We claim:
1. An alignment system for a light beam, said system comprising
   (a) an emitter for receiving a main inlet beam constituted by a main radiation and for transmitting it in the form of a main link beam, said emitter comprising a direction controlling means for controlling a direction of said main link beam;
   (b) a movable receiver at a distance from said emitter for receiving said main link beam and for applying thereto a controllable angular deflection adapted to transform said main link beam into a main outlet beam aligned on a utilization axis related to a structure external to said alignment system; and
   (c) optical aiming means comprising
      (i) an auxiliary source for generating auxiliary radiation in the form of an auxiliary inlet beam aligned on the path of said main inlet beam, whereby said auxiliary inlet beam is transformed by said emitter into an auxiliary link beam aligned on the path of said main link beam, and said auxiliary link beam is transformed by said receiver into an auxiliary outlet beam aligned on the path of said main outlet beam;
      (ii) emitter control means responsive to a fraction of the radiation of said auxiliary link beam received by said receiver in order to control said emitter for causing said auxiliary link beam and said main link beam to be directed towards said receiver, said emitter control means comprising a retroreflector assembly connected to said receiver and constituted by a plurality of retroreflectors each returning a corresponding portion of said link beam back along the direction of said link beam in order to constitute a retroreflected beam;

(iii) a retroreflected beam detector connected to said emitter and forming an image of said retroreflector assembly on an image analyzer system for detecting the position of said receiver relative to said link beam; and (iv) receiver control means responsive to a fraction of the radiation of said auxiliary link beam received by said receiver in order to control said angular deflection for causing said main outlet beam and said auxiliary outlet beam to be aligned on said utilization axis;

(v) wherein said auxiliary inlet beam is a tubular beam formed coaxially around said main inlet beam, said emitter and receiver control means being located off the path of said main radiation and comprising reflector means for receiving parts of said link and outlet auxiliary beam, respectively, and for reflecting said parts towards said emitter.

2. A system according to claim 1, wherein said image analyzer system serves to compare the light flux received by each of various image elements respectively formed by various ones of said retroreflectors and which form portions of said image of said retroreflector assembly.

3. A system according to claim 1, wherein there are at least three of said retroreflectors which are angularly distributed around the periphery of said link beam.

4. A system according to claim 3, wherein said retroreflectors leave angular gaps between one another to pass light which is usable by other portions of said control means.

5. An alignment system according to claim 1, said system comprising:
said emitter;

said receiver receiving said link beam and applying a controllable angular deflection thereto in order to transform it into said outlet beam; and receiver control means for controlling said controllable deflection to align said link beam with a utilization axis related to a structure external to said alignment system, said receiver control means themselves comprising:

a receiver mirror connected to said receiver in order to reflect a portion of the light of said link beam towards said emitter in the form of a return beam whose direction is affected by said controllable deflection; and an error-measuring detector connected to said emitter and responsive to deflections of said reflected beam;

wherein said receiver mirror is placed on the path of said outlet beam so that said return beam is formed from said outlet beam and passes through said receiver on its return path, said mirror having an axis perpendicular to its surface and being mounted to aim relative to said external structure to bring its axis into alignment with said utilization axis.

6. A system according to claim 5, wherein said receiver mirror is held at a distance from said receiver by an outlet part connected thereto, said outlet part being provided with aiming means bearing against said external structure in order to aim said receiver mirror relative to said utilization axis.

7. A system according to claim 1, wherein said emitter and receiver control means comprise an annular beam splitter surrounding said main inlet beam and directing said parts reflected by said reflector means towards detection and analysis means.

8. A system according to claim 1, wherein said receiver and said reflector means of said control means are mounted on a same carrier the position of which is controllable.

* * * * *